US008182333B2

(12) United States Patent
Pacey

(10) Patent No.: US 8,182,333 B2
(45) Date of Patent: May 22, 2012

(54) WAGERING GAME WITH AUTO-TRIGGERED PLAYER DEVICE

(75) Inventor: Larry J. Pacey, Chicago, IL (US)

(73) Assignee: WMS Gaming LLP, Waukegan, IL (US)

( * ) Notice: Subject to any disclaimer, the term of this patent is extended or adjusted under 35 U.S.C. 154(b) by 622 days.

(21) Appl. No.: 12/377,259

(22) PCT Filed: Aug. 9, 2007

(86) PCT No.: PCT/US2007/017705

§ 371 (c)(1), (2), (4) Date: Feb. 11, 2009

(87) PCT Pub. No.: WO2008/021175

PCT Pub. Date: Feb. 21, 2008

(65) Prior Publication Data

US 2010/0197388 A1 Aug. 5, 2010

Related U.S. Application Data

(60) Provisional application No. 60/837,210, filed on Aug. 11, 2006.

(51) Int. Cl.
*A63F 13/00* (2006.01)
*A63F 13/10* (2006.01)

(52) U.S. Cl. .................................................... 463/21

(58) Field of Classification Search .................. 345/169, 345/172, 173, 179; 463/16, 29, 42, 17–21
See application file for complete search history.

(56) References Cited

U.S. PATENT DOCUMENTS

| | | | | |
|---|---|---|---|---|
| 6,315,660 | B1 | 11/2001 | DeMar et al. | 463/16 |
| 6,508,709 | B1 * | 1/2003 | Karmarkar | 463/42 |
| 6,645,075 | B1 * | 11/2003 | Gatto et al. | 463/25 |
| 6,712,698 | B2 | 3/2004 | Paulsen et al. | 463/30 |
| 6,724,370 | B2 * | 4/2004 | Dutta et al. | 345/169 |
| 6,935,951 | B2 | 8/2005 | Paulsen et al. | 463/25 |
| 7,112,138 | B2 | 9/2006 | Hedrick et al. | 463/29 |
| 7,401,300 | B2 * | 7/2008 | Nurmi | 715/866 |
| 7,487,461 | B2 * | 2/2009 | Zhai et al. | 715/773 |
| 7,950,996 | B2 * | 5/2011 | Nguyen et al. | 463/25 |
| 2003/0054878 | A1 * | 3/2003 | Benoy et al. | 463/29 |

(Continued)

FOREIGN PATENT DOCUMENTS

WO WO 02/17251 A2 2/2002

OTHER PUBLICATIONS

PCT International Search Report for International Application No. PCT/US2007/17705 dated Aug. 9, 2007 (2 pages).

(Continued)

*Primary Examiner* — Evan Pert
(74) *Attorney, Agent, or Firm* — Nixon Peabody LLP

(57) ABSTRACT

A gaming system including an input device for receiving a wager to play a wagering game. The gaming system also includes a display for displaying a randomly selected outcome of the wagering game and a touch-screen input device in association with the display. In response to a predetermined criterion, a pop-up window is displayed on the display that allows the player to enter data into a field on the display. The pop-up window preferably includes keys to enter the data, such as an image of a standard keyboard for entering alpha-numeric data.

20 Claims, 7 Drawing Sheets

U.S. PATENT DOCUMENTS

| | | | | |
|---|---|---|---|---|
| 2004/0219968 | A1 | 11/2004 | Fiden et al. | 463/20 |
| 2004/0219969 | A1 | 11/2004 | Casey et al. | 463/20 |
| 2005/0075165 | A1* | 4/2005 | George et al. | 463/29 |
| 2005/0143169 | A1 | 6/2005 | Nguyen et al. | 463/25 |
| 2005/0187005 | A1 | 8/2005 | Rose | 463/20 |
| 2005/0255911 | A1 | 11/2005 | Nguyen et al. | 463/25 |
| 2005/0277469 | A1 | 12/2005 | Pryzby et al. | 463/35 |
| 2006/0025215 | A1 | 2/2006 | Thomas | 463/30 |
| 2006/0063580 | A1* | 3/2006 | Nguyen et al. | 463/16 |
| 2006/0073888 | A1 | 4/2006 | Nguyen et al. | 463/27 |
| 2006/0189367 | A1 | 8/2006 | Nguyen et al. | 463/16 |
| 2006/0281541 | A1 | 12/2006 | Nguyen et al. | 463/25 |
| 2007/0060363 | A1 | 3/2007 | Nguyen | 463/42 |
| 2007/0202943 | A1* | 8/2007 | Thomas | 463/27 |

OTHER PUBLICATIONS

PCT Written Opinion for International Application No. PCT/US2007/17705 dated Aug. 9, 2007 (3 pages).

* cited by examiner

WAGERING GAME WITH AUTO-TRIGGERED PLAYER DEVICE

CROSS REFERENCE TO RELATED APPLICATIONS

This application is a U.S. national stage of International Application No. PCT/US2007/017705, filed Aug. 9, 2007, which is related to and claims priority to U.S. Provisional Application No. 60/837,210, filed Aug. 11, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a pop-up screen allowing for information to be input into the gaming machine.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In some current gaming machines, there is an option for players to input alphanumeric strings into text boxes. However, the physical keyboards and input devices are included on the gaming machine, adding to the size and cost of manufacturing the machine. As the technology of gaming machines progresses, there will be more and more opportunities for player inputs of text, alphanumeric strings, etc. As such, there is a need to enable a player to input text and alphanumeric strings without requiring a permanent physical keyboard on the gaming machine.

SUMMARY OF THE INVENTION

According to one aspect of the present invention, a gaming system for conducting a wagering game includes an input device for receiving a wager to play a wagering game. A display for displaying a randomly selected outcome of the wagering game is also included. The gaming system also includes a touch-screen input device in association with the display. In response to a predetermined criterion, a pop-up window is displayed on the display to allow the player to enter data into a field on the display. The pop-up window may preferably include keys to enter the data, such as an image of a standard keyboard for entering alpha-numeric data.

According to another aspect of the invention, a method of conducting a wagering game on a gaming system comprises conducting the wagering game and displaying a randomly selected outcome of the wagering game. In response to a predetermined criterion, data from a player is received via a pop-up window displayed on a video display. In response to the data being received, the data is displayed in a field on the video display. The present invention also contemplates a computer readable storage medium encoded with instructions for directing a gaming system to perform the above method.

According to yet another aspect of the invention, a gaming system A gaming system comprising is provided that includes an input device for receiving a wager to play a wagering game and a display device for displaying the wagering game. A controller is coupled to the input device and the display. The controller is operative (i) to cause the display device to display a pop-up window for receiving input data from a player and (ii) to cause the display to display information corresponding to the input data in a field.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
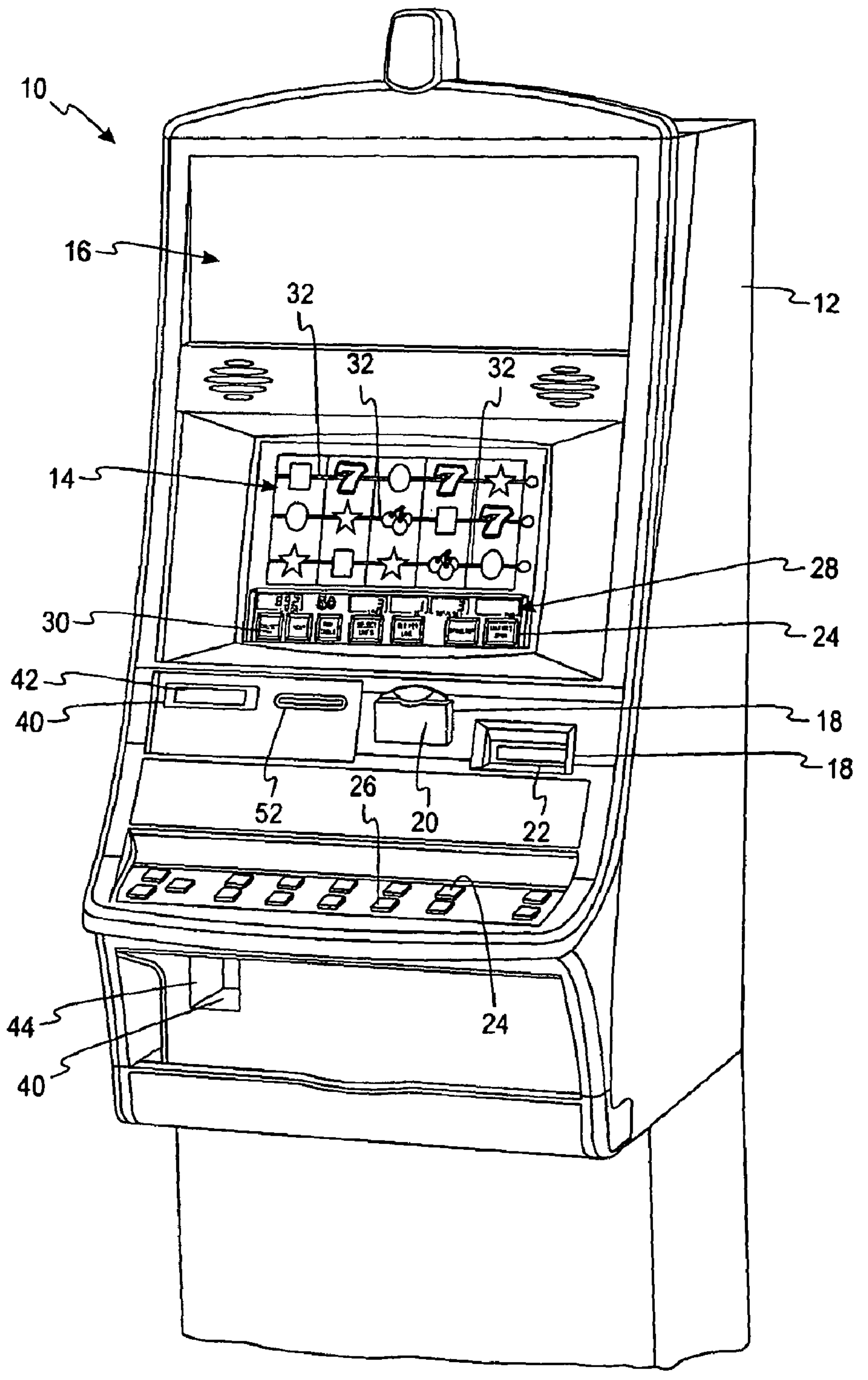
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
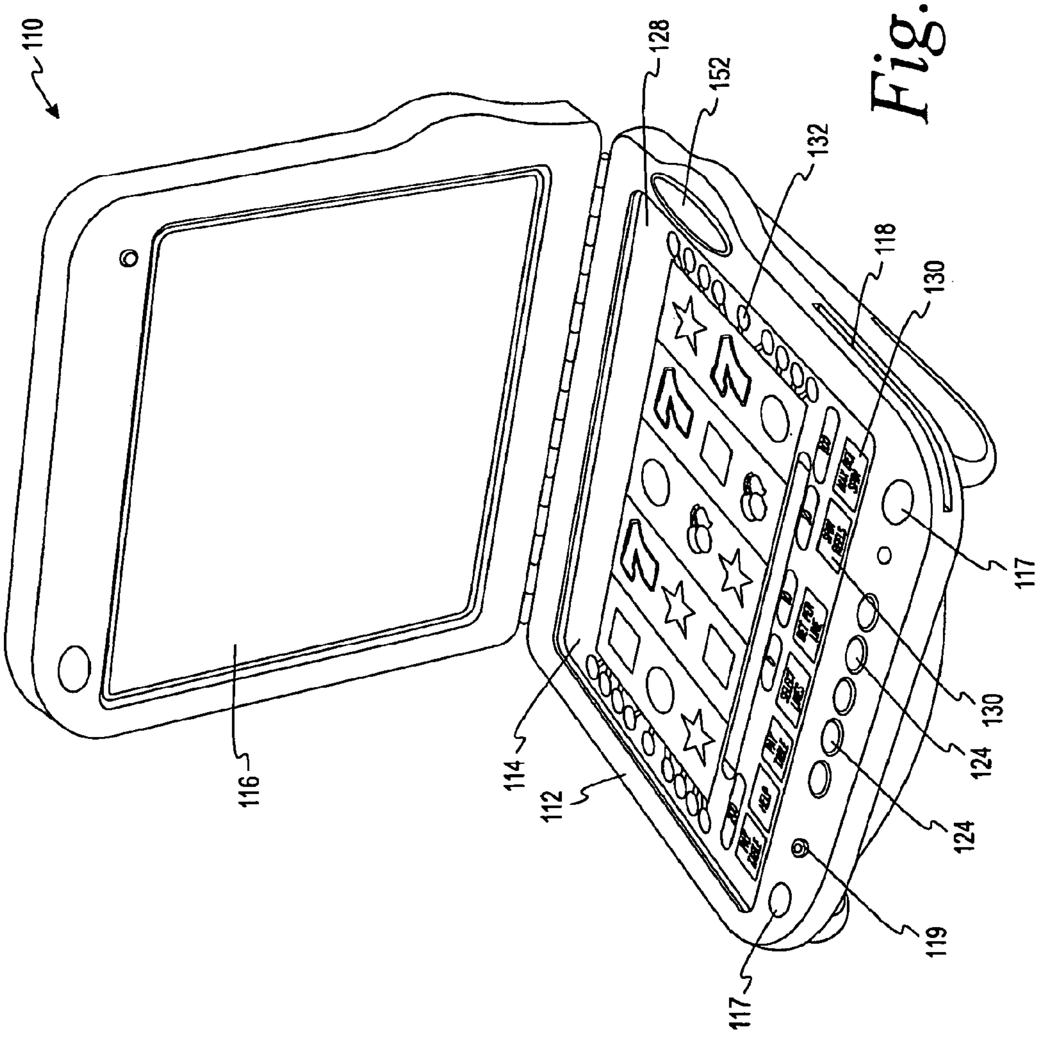
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
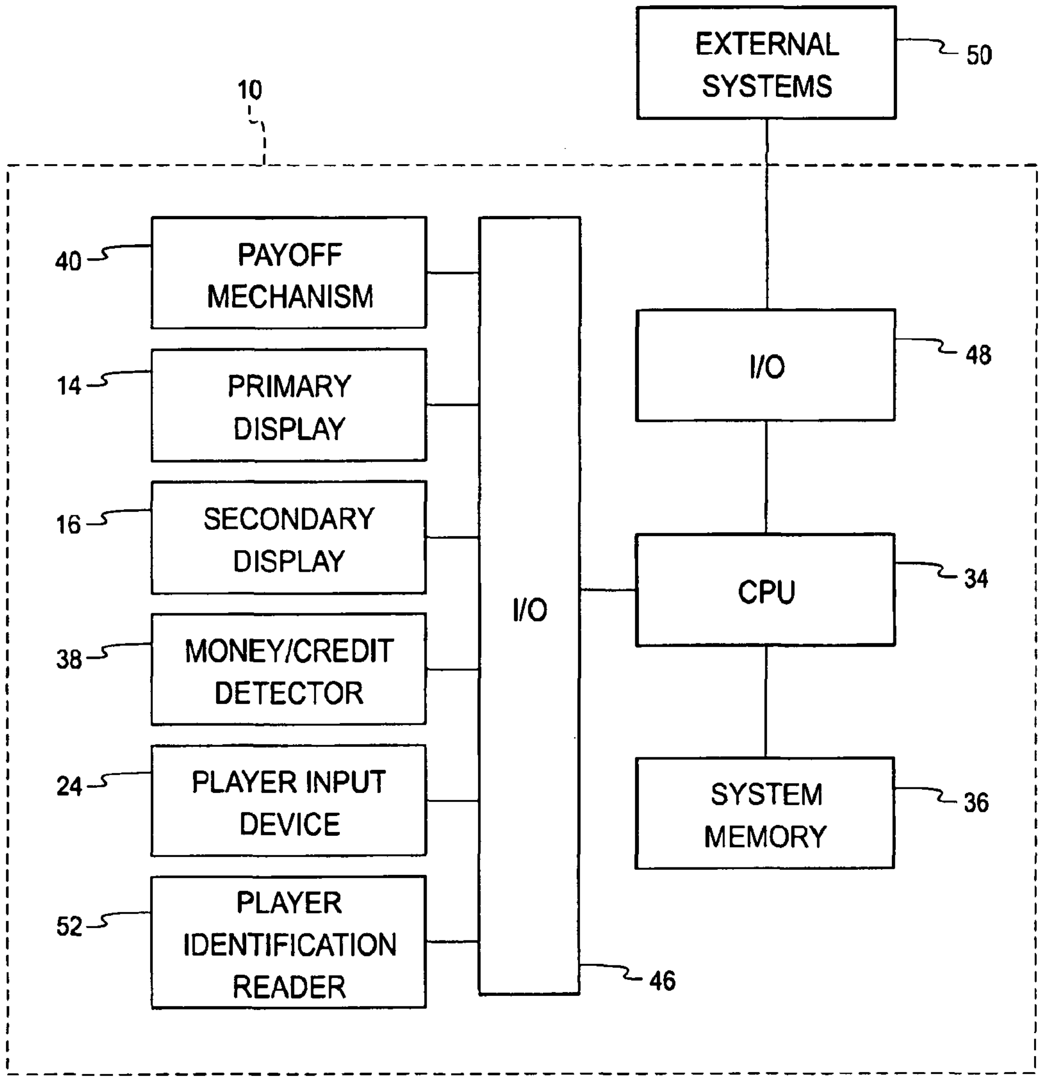
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcard, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
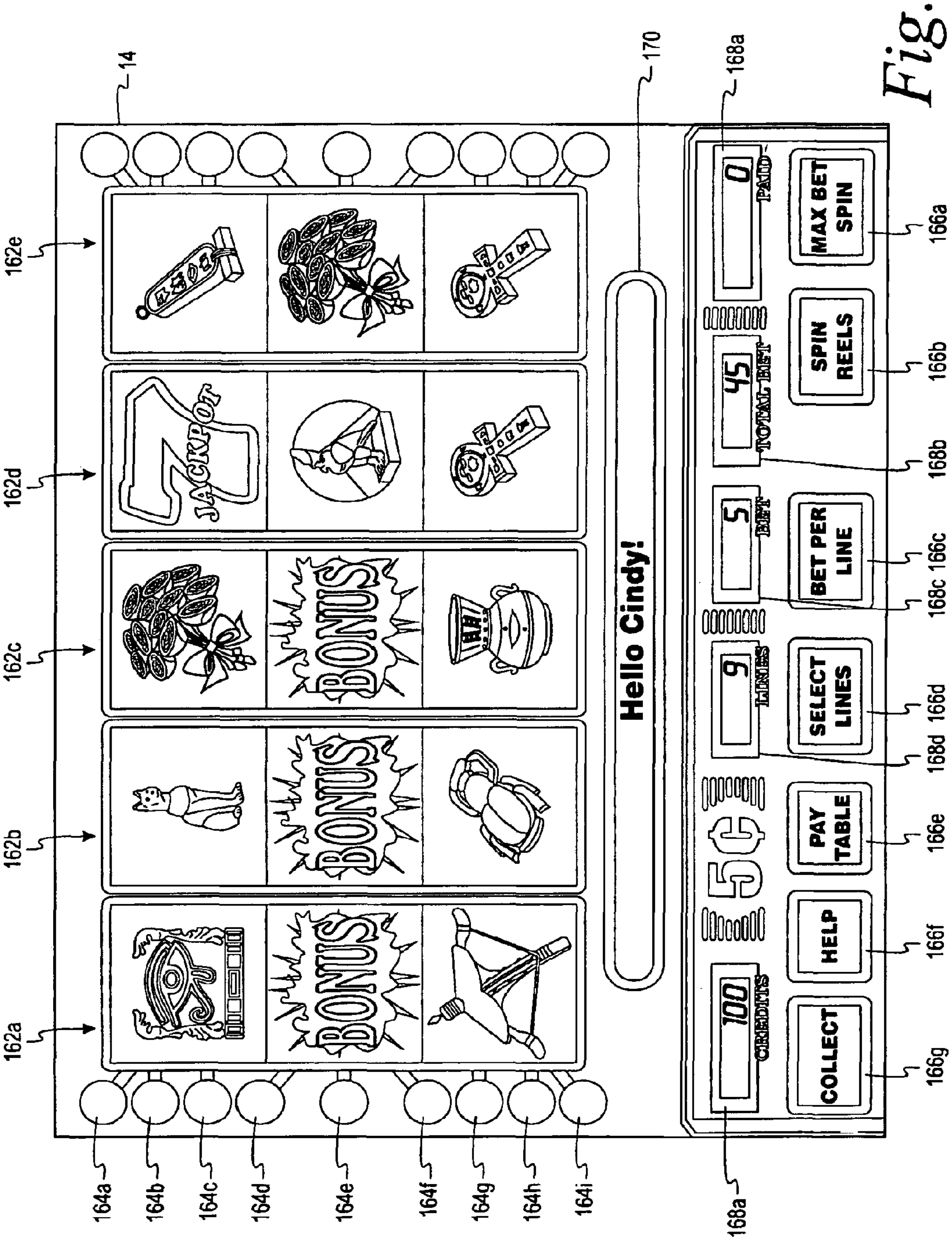
FIG. 3 is the display of the basic game according to one embodiment of the present invention.

Turning now to FIG. 3, the primary display 14 according to one embodiment of the present invention is illustrated. In this embodiment, the basic game is a slot machine game with symbols on five different reels 162*a*, 162*b*, 162*c*, 162*d*, 162*e*.

The reels 162*a*, 162*b*, 162*c*, 162*d*, 162*e* may be either traditional mechanical reels, electromechanical reels, or they may be computer-generated images of reels, with each reel composed of a plurality of symbols. In this embodiment, there are multiple pay lines represented by pay line indicators 164 across the various reels 162*a*, 162*b*, 162*c*, 162*d*, 162*e*. While multiple pay lines are shown, a gaming machine 10 having a single pay line will also work with the present invention.

During the basic game, the player places a wager on any number of pay lines. In the illustrated embodiment, the wager may be between one and five credits per pay line. However, in other embodiments, other wager amounts may be made. Once the player has placed the wager, the reels 162*a*, 162*b*, 162*c*, 162*d*, 162*e* begin to spin.

As illustrated in FIG. 3, a plurality of keys 166*a*, 166*b*, 166*c*, 166*d*, 166*e*, 166*f*, 166*g* are near the bottom of the display 14. These keys 166 enable the player to perform various functions, such as selecting the pay lines to play, selecting a wager amount, spinning the reels, etc. Indicators 168*a*, 168*b*, 168*c*, 168*d*, 168*e* are located above the keys 166 and provide the player with information such as the amount of the current wager, the amount won, and the total number of credits remaining.

The primary display 14 may also include a communication display 170 that provides personalized and/or customized information to the player, such as a personalized greeting or an indication that the spin was a winning spin. In the embodiment illustrated in FIG. 3, the communication display 170 is currently displaying a customized greeting to the player. The gaming machine 10 may obtain the personal information from the information input into the player information reader 52. In other embodiments, the personal information may be added by the player in a pop-up input mechanism, as will be described below in reference to FIGS. 4 and 5.

In the embodiment illustrated in FIG. 3, a touch screen input device works in conjunction with the primary display 14. Each of the plurality of keys 166*a*, 166*b*, 166*c*, 166*d*, 166*e*, 166*f*, 166*g* are touch screen-buttons. When a player presses on one of the keys 166, an input device may be activated that allows the player to input information into that field. For example, if a player decides to change the amount being wagered, the player touches (i.e., activates) the "bet per line" button 166*c*. A pop-up window, such as the one shown in FIG. 4 or 5, may then be displayed allowing the player to input data. After the player inputs the change, the change would be displayed on the "bet" indicator 168*c*. The communication display 170 may also be associated with a touch-screen button. The communication display 170 may initially inquire about the player's identity (actual name, username, player's ID number, passcode, etc). In response to the player touching the display 14 at the region of the communication display 170, a pop-up window, such as the one shown in FIG. 4 or 5, may then be displayed allowing the player to input data related to his or her identity.

Figure 4:
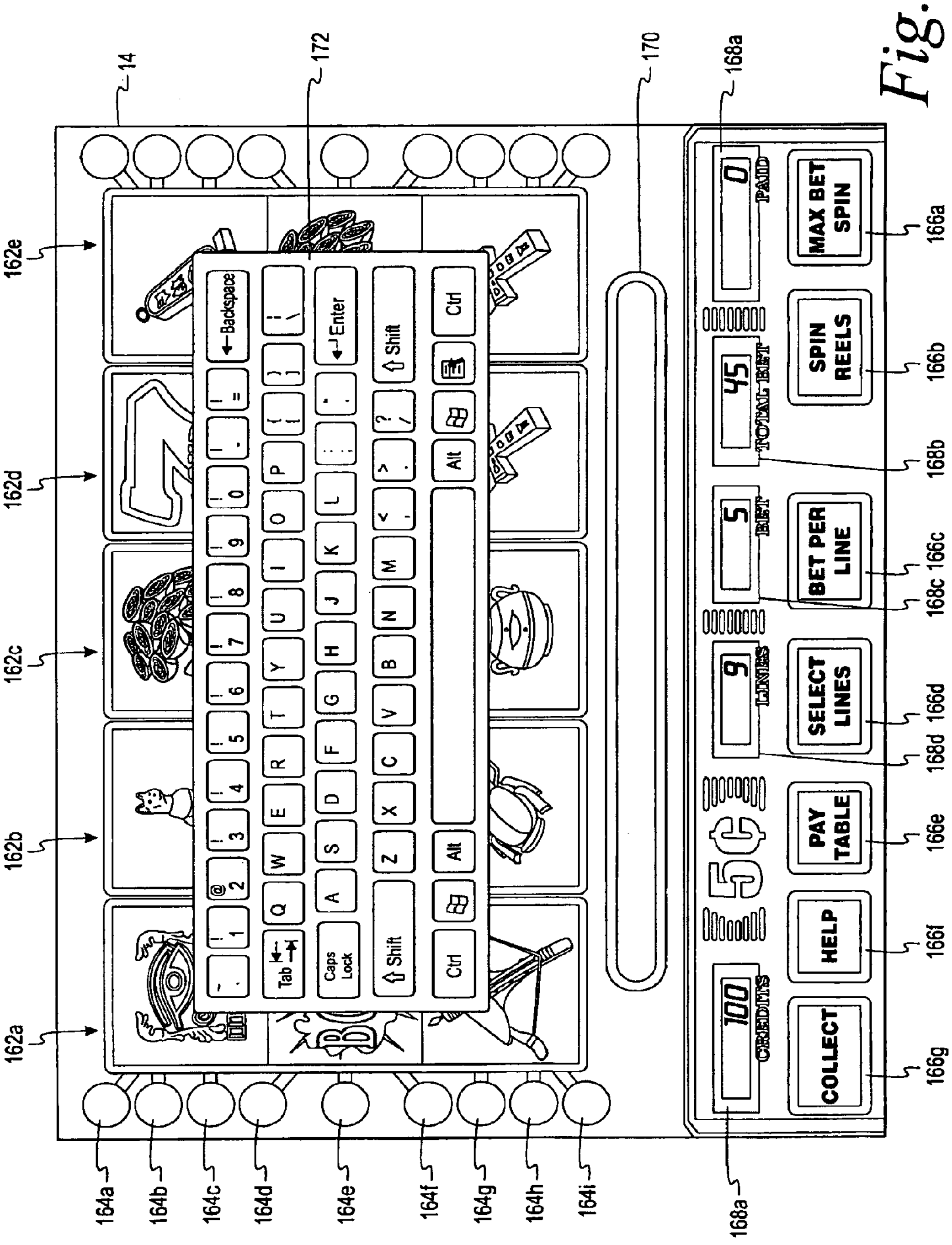
FIG. 4 is the display of the basic game of FIG. 3 including a pop-up screen according to one embodiment of the present invention.

FIG. 4 illustrates one method of inputting information into a field on the display via a pop-up window. After the player has pressed one of the keys 166 on the communication display 170, a pop-up keyboard 172 is shown overlaying the reels 162*a*, 162*b*, 162*c*, 162*d*, 162*e*. The player can input information by pressing the letters (or numbers) on the pop-up keyboard 172. The pop-up keyboard 172 either simply appears on the display 14, or alternatively, an animation delivers the pop-up keyboard 172 onto the display 14 by, for example, zooming in, entering from the side of the display 14, dropping down, or any number of other possible animations.

In some embodiments, the player may be asked for additional information and a statement on the display 14 requesting this information may be displayed above the pop-up keyboard 172. For example, if the player is inputting personalized information for the communication display 170, the gaming machine 10 may also ask if the player would like to register as a preferred player. The player may then be able to input contact information, such as phone numbers, home address, and an e-mail address. In some embodiments, the pop-up keyboard 172 allows the player to input information in lieu of inserting a player tracking card into the player information reader 52. The input information would allow the player to accumulate points or other rewards, even if he/she had forgotten his/her card.

Figure 5:
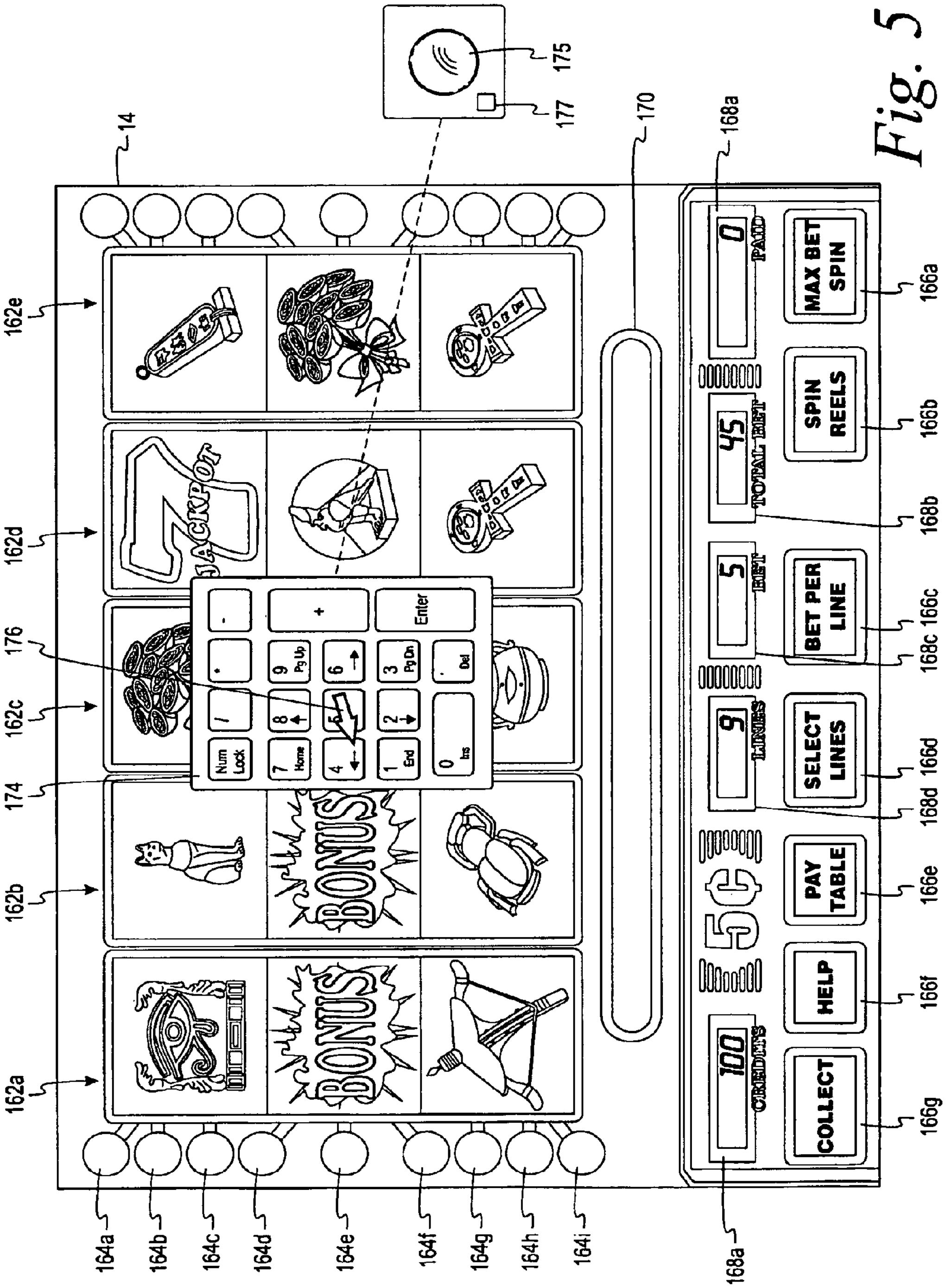
FIG. 5 is the display of the basic game of FIG. 3 including a pop-up screen according to another embodiment of the present invention.

Turning now to FIG. 5, another embodiment of the input device is shown. In this embodiment, a pop-up numeric keypad 174 is displayed in response to one of the keys 166*a-e* or the communication display 170 being touched by the player. The pop-up numeric keypad 174 could be used to input numeric information such as the wager amount, lines wagered, etc. In some embodiments, the numeric keypad 174 may be utilized to input a PIN or other identification number. The PIN may be used to access player information or saved data. The input entered by the player may be used to track player information. In such embodiments, the input could be used in lieu of a player tracking card.

FIG. 5 also shows an alternative method for entering data that does not require a touch-screen on the display. As shown in FIG. 5, the numeric keypad 174 may also be coupled to a mechanical track-wheel 175 (or mouse) that is located on the gaming machine 10. When a player moves the mechanical track-wheel 175, an arrow 176 on the numeric keypad 174 moves. When the arrow 176 is located over a desired key, the player actuates a physical button 177 and the character (e.g., alpha-numeric character) associated with the desired key is entered. In other embodiments, the pop-up window may include a virtual mouse or virtual track-wheel that allows the user to move a curser, like the arrow 176 of FIG. 5.

Figure 6:
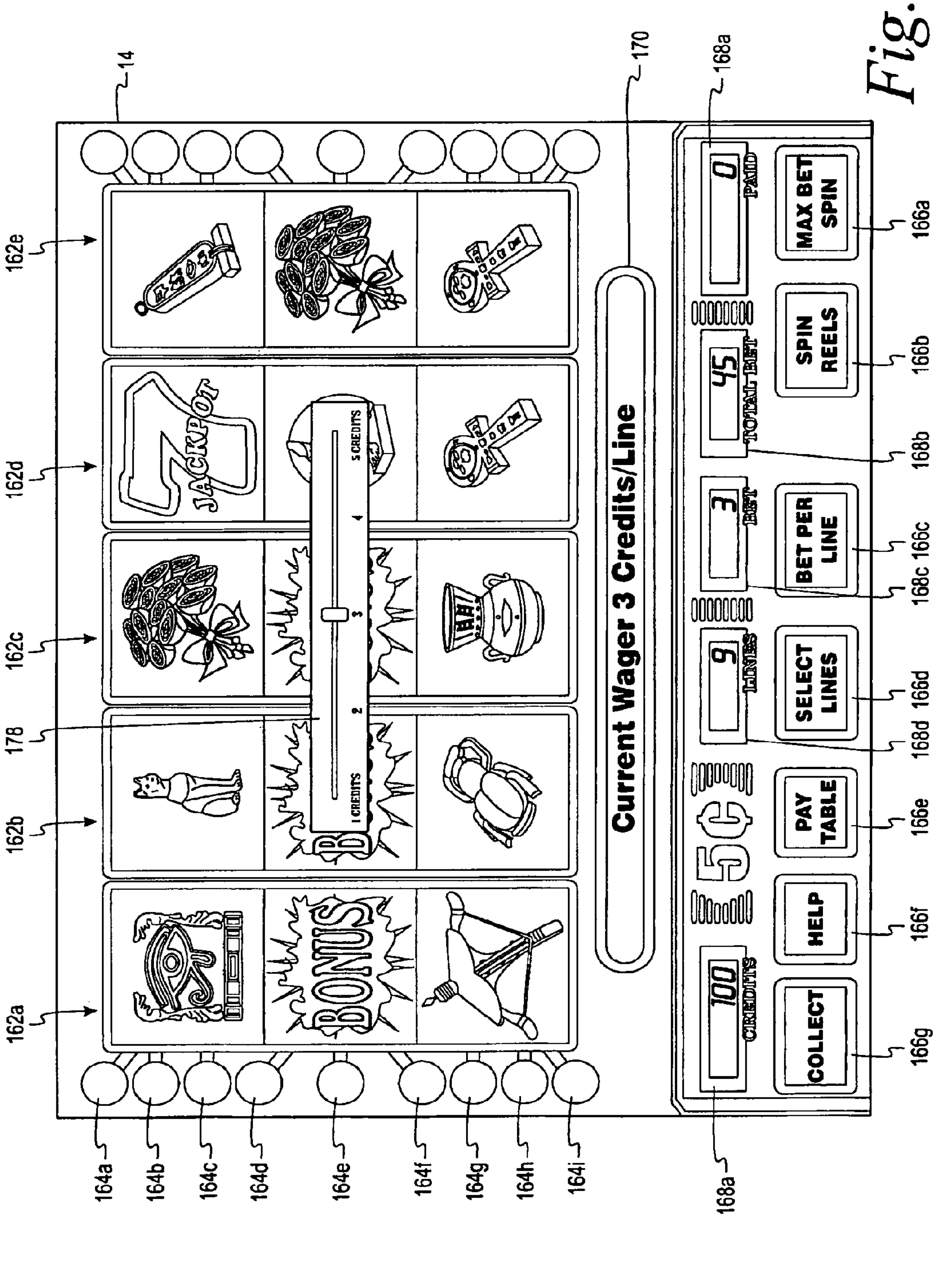
FIG. 6 is the display of the basic game of FIG. 3 including a pop-up screen according to another embodiment of the present invention.

In another embodiment shown in FIG. 6, a virtual slider 178 is displayed in a pop-up window, allowing a player to change the amount wagered. In this example, the player activates the "bet per line" touch screen key 166*c* and the virtual slider 178 would appear on the primary display 14. The virtual slider 178 would illustrate a range of credits (in this example, one to five credits). The player would then be able to slide a finger across the virtual slider 178 to change the number of credits being wagered. As the player slides his/her finger to the right, the amount of the wager increases.

In some embodiments, the pop-up window with the input device may appear as a result of other predetermined criteria, such as an event (e.g., one of the randomly selected outcomes) in the wagering game. For example, if the player achieves a bonus game that has trivia questions, then the player may be asked to input answers via the pop-up keyboard 172 in FIG. 4. In another embodiment, an event in the basic wagering game, such as the free-spin outcome, may trigger the pop-up window that includes an input device (e.g., the numeric keypad 174) to allow the player to select which five out of the nine pay lines to activate during the free spin. The previous two examples include the entry of data into a field that has an effect on the randomly selected outcome of some aspect of the wagering game.

Alternatively, the keyboard may pop up as soon as the player inserts coins or begins to play a new wagering game. The display 14 on the gaming machine 10 is then used to request information from the player such as the player's name, PIN, etc., via the pop-up window.

In another embodiment, the reels may be mechanical reels and there may be a transmissive display that is used over the mechanical reels. The transmissive display is generally transparent until activated, at which time the player can perceive the images displayed by the transparent display over the underlying mechanical reels. The transparent display can be used to provide the pop-up window with the input device. Other examples of displaying images over mechanical reels are described in U.S. Pat. No. 6,517,433, which is hereby incorporated by reference in its entirety. These images may also include the pop-up window.

Each of these embodiments and obvious variations thereof is contemplated as falling within the spirit and scope of the claimed invention, which is set forth in the following claims.

What is claimed is:

1. A gaming system comprising:

an input device for receiving a wager to play a wagering game;

a display for displaying a first randomly selected outcome in the wagering game; and a touch-screen input device in association with the display;

wherein, in response to the first randomly selected outcome being a triggering outcome, a pop-up window is displayed on the display and partially overlaying the wagering game to allow a player to enter alpha-numeric data into a field on the display; and in response to alpha-numeric data being entered by the player, displaying the entered alpha-numeric data in a field on the display device; and modifying a displayed second randomly selected outcome in the wagering game by the received alpha-numeric data.

2. The gaming system of claim 1, wherein the predetermined criterion is the receipt of the wager.

3. The gaming system of claim 1, wherein the predetermined criterion is one of the randomly selected outcomes of the wagering game.

4. The gaming system of claim 1, wherein the field has a corresponding button, and the predetermined criterion is activation of the corresponding button.

5. The gaming system of claim 1, wherein the pop-up window includes at least one of an alpha-numeric keyboard, a numeric keypad, a mouse, a track wheel, and a slider.

6. The gaming system of claim 1, wherein the pop-up window is displayed over video elements associated with the wagering game.

7. The gaming system of claim 1, wherein the field relates to information concerning the player.

8. The gaming system of claim 1, wherein the field relates to information that dictates the randomly selected outcome.

9. A method of conducting a wagering game, comprising:

conducting, by one or more processors, the wagering game;

displaying, on a video display device, a first randomly selected outcome in the wagering game;

in response to the first randomly selected outcome being a triggering outcome, displaying, on the video display device, a pop-up window at least partially overlaying the wagering game;

receiving inputs of alpha-numeric data from a player via the displayed pop-up window;

in response to the alpha-numeric data being received, displaying the received alpha-numeric data in a field on the video display device; and determining a second randomly selected outcome in the wagering game, the second randomly selected outcome being modified by the received alpha-numeric data.

10. The method of claim 9, wherein the predetermined criterion is a receipt of a wager.

11. The method of claim 9, wherein the predetermined criterion is a player activating a button on a gaming machine conducting the wagering game.

12. The method of claim 9, wherein the pop-up window includes a touch-screen device.

13. The method of claim 9, wherein the field is for providing personal information related to the player.

14. The method of claim 13, further comprising displaying personalized information related to the player in response to receiving the personal information.

15. The method of claim 9, wherein the data for the field is wagering information.

16. The method of claim 9, wherein the receiving includes displaying a standard keyboard having keys corresponding to alpha-numeric data.

17. The method of claim 9, wherein the predetermined criteria is a wagering game outcome being achieved.

18. A gaming system comprising:

an input device for receiving a wager to play a wagering game;

a display device for displaying a first randomly selected outcome of the wagering game; and a controller coupled to the input device and the display device, the controller operative (i) to cause the display device to display a pop-up window in response to the first randomly selected outcome being a triggering outcome, the pop-up window partially overlaying the wagering game for receiving alpha-numeric data from a player in response to a predetermined criterion (ii) receive inputs of alpha-numeric data from a player via the displayed pop-up window; iii) to cause the display to display information corresponding to the received alpha-numeric data in a field; and determine a second randomly selected outcome in the wagering game, the second randomly selected outcome being modified by the received alpha-numeric data.

19. The gaming system of claim 18, wherein the controller is external to the gaming machine.

20. The gaming system of claim 19, wherein the pop-up window includes a video image of an alpha-numeric keypad.

* * * * *

UNITED STATES PATENT AND TRADEMARK OFFICE

CERTIFICATE OF CORRECTION

PATENT NO. : 8,182,333 B2
APPLICATION NO. : 12/377259
DATED : May 22, 2012
INVENTOR(S) : Larry J. Pacey It is certified that error appears in the above-identified patent and that said Letters Patent is hereby corrected as shown below:

Title Page

In the Title, item (54):

Replace "Wagering Game with Auto-Triggered Player Device" with --Wagering Game with Auto-Triggered Player-Input Device--

In the Assignee, item (73):

Replace "WMS Gaming LLP" with --WMS Gaming Inc.--

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,182,333 B2
APPLICATION NO. : 12/377259
DATED : May 22, 2012
INVENTOR(S) : Larry J. Pacey It is certified that error appears in the above-identified patent and that said Letters Patent is hereby corrected as shown below:

Title Page, item (54) and in the Specification, at Column 1, lines 1 and 2, Title:

Replace "Wagering Game with Auto-Triggered Player Device" with --Wagering Game with Auto-Triggered Player-Input Device--

Title Page, item (73) Assignee:

Replace "WMS Gaming LLP" with --WMS Gaming Inc.--

This certificate supersedes the Certificate of Correction issued April 30, 2013.

Signed and Sealed this
Twenty-eighth Day of May, 2013

Teresa Stanek Rea
*Acting Director of the United States Patent and Trademark Office*